US00RE42169E

(19) United States
(12) Reissued Patent
Weber

(10) Patent Number: US RE42,169 E
(45) Date of Reissued Patent: Feb. 22, 2011

(54) METHOD, APPARATUS, AND COMPUTER PROGRAM PRODUCT FOR EFFICIENT SERVER RESPONSE GENERATION USING INTERMEDIATE STATE CACHING

(75) Inventor: Jay C. Weber, Menlo Park, CA (US)

(73) Assignee: Rehle Visual Communications LLC, Las Vegas, NV (US)

(21) Appl. No.: 11/318,395

(22) Filed: Dec. 22, 2005

Related U.S. Patent Documents

Reissue of:
(64) Patent No.: 6,671,719
Issued: Dec. 30, 2003
Appl. No.: 10/251,176
Filed: Sep. 20, 2002

U.S. Applications:
(62) Division of application No. 09/318,493, filed on May 25, 1999, now Pat. No. 6,513,062.

(51) Int. Cl.
*G06F 15/167* (2006.01)

(52) U.S. Cl. ..... 709/216

(58) Field of Classification Search ..... 709/217–229
See application file for complete search history.

(56) References Cited

U.S. PATENT DOCUMENTS 5,452,447 A 9/1995 Nelson et al.
5,511,208 A 4/1996 Boyles et al.
5,682,514 A 10/1997 Yohe et al.
5,737,523 A 4/1998 Callaghan et al.
5,740,370 A 4/1998 Battersby et al.
5,787,470 A 7/1998 DeSimone et al.
5,793,966 A * 8/1998 Amstein et al. ..... 709/203
5,826,253 A 10/1998 Bredenberg
5,852,717 A 12/1998 Bhide et al.
5,864,852 A 1/1999 Luotonen
5,892,914 A 4/1999 Pitts (Continued)

FOREIGN PATENT DOCUMENTS

WO WO 99/03047 * 1/1999
WO 99/03047 1/1999
WO WO 99/05619 * 2/1999
WO 99/05619 2/1999
WO 99/17227 4/1999
WO WO 99/17227 A1 * 8/1999
WO PCT/US00/09820 2/2000

OTHER PUBLICATIONS

Official Action in European Application No. 00937517.1 dated May 11, 2005, 5 pages.
Response to Official Action in European Application No. 00937517.1 dated Sep. 28, 2005, 17 pages.
Summons to attend oral proceedings pursuant to Rule 115(1) EPC for European Application No. 00937517.1 dated Jul. 2, 2010, 9 pages.
Search Report for International Application No. PCT/US2000/009820 dated Jun. 5, 2002, 2 pages.
Written Opinion for International Application No. PCT/US2000/009820 dated Aug. 2, 2002, 2 pages.

* cited by examiner

*Primary Examiner*—Krisna Lim

(57) ABSTRACT

Disclosed is a system for improving server efficiency by caching intermediate states encountered in generating responses to requests. The results of a mapping from an external name for a resource to an internal name for the resource may be cached as may the response header lines, or the body of the response message. In another disclosed aspect, candidates for intermediate state caching are selected from plain and small files. When the resource involves the product of an executable, another aspect involves delaying parsing request headers until necessary and then only parsing the headers required for generating the response.

88 Claims, 3 Drawing Sheets

U.S. PATENT DOCUMENTS 5,933,849 A 8/1999 Srbljic et al.
6,003,082 A 12/1999 Gampper et al.
6,023,726 A 2/2000 Saksena
6,078,929 A 6/2000 Rao
6,085,234 A 7/2000 Pitts et al.
6,128,655 A 10/2000 Fields et al.
6,128,701 A 10/2000 Malcolm et al.
6,182,127 B1 1/2001 Cronin, III et al.
6,185,598 B1 2/2001 Farber et al.
6,185,608 B1 2/2001 Hon et al.
6,209,048 B1 * 3/2001 Wolff ..... 710/62
6,212,565 B1 4/2001 Gupta
6,240,461 B1 5/2001 Cieslak et al.
6,243,719 B1 6/2001 Ikuta et al.
6,243,760 B1 6/2001 Armbruster et al.
6,286,043 B1 * 9/2001 Cuomo et al. ..... 709/223
6,298,356 B1 10/2001 Jawahar et al.
6,324,685 B1 11/2001 Balassanian
6,330,561 B1 12/2001 Cohen et al.
6,330,606 B1 12/2001 Logue et al.
6,393,422 B1 5/2002 Wone
6,397,246 B1 5/2002 Wolfe
6,442,601 B1 8/2002 Gampper et al.
6,490,625 B1 12/2002 Islam et al.
6,505,241 B2 1/2003 Pitts
6,507,867 B1 * 1/2003 Holland et al. ..... 709/219
6,519,646 B1 * 2/2003 Gupta et al. ..... 709/229

METHOD, APPARATUS, AND COMPUTER PROGRAM PRODUCT FOR EFFICIENT SERVER RESPONSE GENERATION USING INTERMEDIATE STATE CACHING

Matter enclosed in heavy brackets [ ] appears in the original patent but forms no part of this reissue specification; matter printed in italics indicates the additions made by reissue.

This application is a divisional of U.S. patent application Ser. No. 09/318,493, filed May 25, 1999, now U.S. Pat. No. 6,513,062 issued Jan. 28, 2003.

FIELD

Features of the invention relate generally to server performance improvements and, more particularly, to performance improvements based on elimination of repeated processing.

BACKGROUND

A server receiving numerous requests for resources within a brief period of time must be highly efficient in generating responses if the server is going to fulfill the requests within an acceptable period of time. One illustrative context where this problem arises is in connection with Enhanced Television ("ETV"). In the ETV context, typically a video production is distributed to numerous client applications. The video production has associated with it one or more enhancing resources that may be selected by a viewer of the video production. Conventionally, the enhancing resources are made available to the viewer by including an identifier of the resource in the video production. The viewer's client platform, e.g., a set-top box or computer, extracts the resource identifier and provides an indication to the viewer that enhancing resources are available. If the viewer selects the resource, a request is sent with the client application resident in the viewer's client platform. Frequently in the ETV context, numerous client applications each send requests contemporaneously. This aspect is typically present when, for instance, the video production is broadcast and each viewer becomes aware of the availability of the enhancing resource from the broadcast video production virtually simultaneously. It would thus be desirable for operators of servers receiving numerous simultaneous requests for server efficiency to be improved.

Unfortunately, conventional servers are not highly efficient. For instance, when a conventional HTTP server[,] receives a request for a uniform resource identifier ('URI') it first parses the request, then parses header lines in the request. Next, the HTTP server applies a rewrite mapping process that transforms an external name for the resource (in the URI) to an internal name used for locating the resource and generating the response. Conventional modules for performing the rewrite mapping are powerful and flexible, but obtain this power and flexibility only through computational expense. After the HTTP server derives an internal name of the resource it must generate the response (by retrieving the associated file and/or running executable code) as well as generating headers for the response. If a request for the same resource, were to arrive at the server an instant later, a conventional server would repeat the foregoing steps. In a context where there are numerous simultaneous requests for the same set of resources, conventional server processing is needlessly redundant and inefficient.

Another type of conventional server is a caching proxy server. A caching proxy server is a conventional server which stores locally (or at least more locally) to a client certain resources that are requested from hosts on a data network, typically the internet. In this way a caching proxy server reduces response time by reducing or eliminating time lags introduced by having to retrieve the resource from a remote host, that may only be available through a slow or congested network connection. However, the caching proxy server does not reduce that component of total response time that is attributable to processing at the sever; a conventional caching proxy must flow through all of the intermediate states as any other server in generating a response. For example, a caching proxy server retains the inefficiencies of a conventional HTTP server in redundantly performing the mapping from an external name to an internal name for repeatedly-requested resources. Indeed, where delays in response time are introduced not from network lags, but from the sheer request volume at the server, a caching proxy server may provide no noticeable benefits to the user whatsoever.

Accordingly, it would be desirable for there to be a means for reducing redundant processing in serving repeated requests for a resource.

SUMMARY

In order to provide these and other objectives, one aspect of the present invention are methods for efficiently generating responses for repeated resource requests. An exemplary method includes: receiving a first request for a first resource; deriving intermediate state information used in generating a first response to the first request and caching the intermediate state information. Then when a second request is received, retrieving the intermediate state information; and generating a second response to the second request using the intermediate state information. Illustrative examples of what the intermediate state information may comprise include: an internal name corresponding to the first resource and a type of the first resource; the first resource; or a plurality of response header lines for the first resource.

Another aspect of the present invention are apparatuses, such as programmed computing hardware, configured for efficiently generating responses for repeated resource requests. An exemplary apparatus includes: a request receiver configured for receiving a first request for a first resource; a request handler configured for deriving intermediate state information used in generating a first response to the first request; a cache storing the intermediate state information; and a request handler configured for retrieving the intermediate state information and further configured for generating a second response to the second request using the intermediate state information. This apparatus may operate, for instance, with similar types of intermediate state information as the forgoing methods.

A still further illustrative method includes: receiving a first request for a first resource, the first request comprising a resource identifier and request modifying information; determining whether generating a response for the first request requires parsing the request modifying information; and, if not, generating the response without parsing the request modifying information. An illustrative apparatus includes: a request receiver configured for receiving a first request for a first resource, the first request comprising a resource identifier and request modifying information; a response generator configured for generating a response to the first request and further configured for determining whether generating the response requires parsing the request modifying information; and a request modifying information parser configured to parse request modifying information only when the response generator determines generating the response requires parsing the request modifying information.

Yet another aspect of the present invention are computer programs products comprising a computer-readable medium having computer readable instructions encoded thereon for efficient server response generation using intermediate state caching. The computer-readable instructions are able to configure computing machinery to carrying on methods in accordance with the invention, or to configure an apparatus in accordance with the invention. So configured, computing machinery provides structural elements for performing functions in accordance with the invention.

In accordance with the forgoing, a summary of an illustrative embodiment may be provided: an HTTP server is modified to carry out the invention; when an HTTP Request Message (comprising a URI) arrives, the server determines if a URI descriptor has already been cached. If not, one is generated. If the request is for a small, plain file, the file and response headers are cached and read out to generate the response. If the response is for an executable, the headers in the Request Message are parsed and the executable generates the response. When a second request arrives for the resource, the server can consult and locate the cached URI descriptor and read out the cached response headers and body. As will be appreciated with reference to the detailed description, illustrative embodiments of the invention obtain efficiencies such as, but not limited to: eliminating parsing of headers in requests until necessary and then only parsing the required headers; caching the costly mapping between an external and internal name for a resource and eliminating redundant processing in repeated requests; caching response headers and body and eliminating redundant processing in repeated requests.

BRIEF DESCRIPTION OF THE DRAWINGS

These and other features, aspects, and advantages of the present invention will become better understood with regard to the following description, appended claims, and accompanying drawings where:

DETAILED DESCRIPTION

Description of Figures

Figure 1:
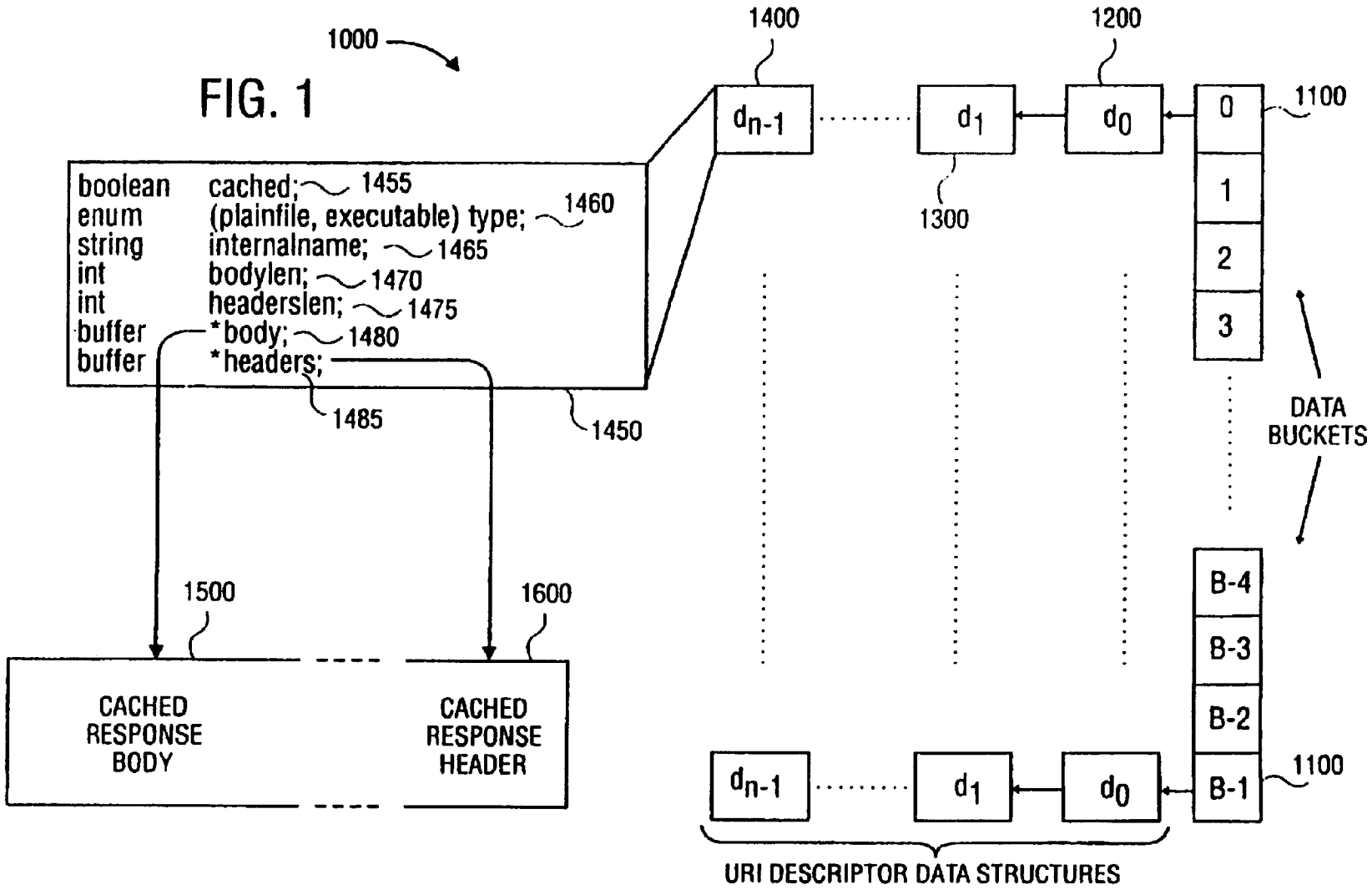
FIG. 1 depicts a cache data architecture in accordance with an illustrative embodiment.

FIG. 1 depicts a cache data architecture 1000 in accordance with an illustrative embodiment of the invention. The cache data architecture 1000 may be used to store information from intermediate states in generating a response to a request for a resource. When another similar request is received, the response may be more efficiently generated by retrieving the intermediate state information from the cache data architecture 1000 rather than regenerating the intermediate state information. Generation and use of the cache data architecture 1000 will be discussed in greater detail in connection with FIG. 2 below.

The illustrative cache data architecture 1000 includes a hash table 1100 comprising a number of 'buckets' (denoted "B" in FIG. 1 for some positive integer, B, chosen conventionally). Associated with each bucket are a set of URI Descriptor data structures entered in the hash table 1100 for storage and retrieval. Illustratively, shown are a first URI Descriptor data structure 1200, a second URI Descriptor data structure 1300, and an $N^{th}$ URI Descriptor data structure 1400. The composition of the URI Descriptor data structures is illustrated in callout 1450 from the $N^{th}$ URI Descriptor data structure 1400.

In this illustrative embodiment, the $N^{th}$ URI Descriptor data structure 1400 comprises a first variable 1455 indicating whether the resource is cached, a second variable 1460 enumerating the type of file associated with the resource, a third variable 1465 comprising an internal name for the resource associated with the URI, a fourth variable 1470 comprising a length of the resource associated with the URI, a fifth variable 1475 comprising a length of headers for the response, a sixth variable 1480 referencing a cached response body 1500, and a seventh variable 1485 referencing a cached response header 1600.

One of skill in the art will appreciate that this particular data arrangement is merely illustrative, that others may be used, that the others may include or exclude variable(s) without departing from the scope and spirit of the present invention or this illustrative embodiment, and that data structures accomplishing analogous data-organizing functions may be used in numerous programming environments, irrespective of whether a given language supports the data types illustrated.

The cached response body 1500 and the cached response header 1600 are preferably stored in random access memory. Conventional systems may swap memory to mass storage, and such systems may also be used. More generally, any storage system proving suitably rapid access should be operable with features of the invention.

Figure 2:
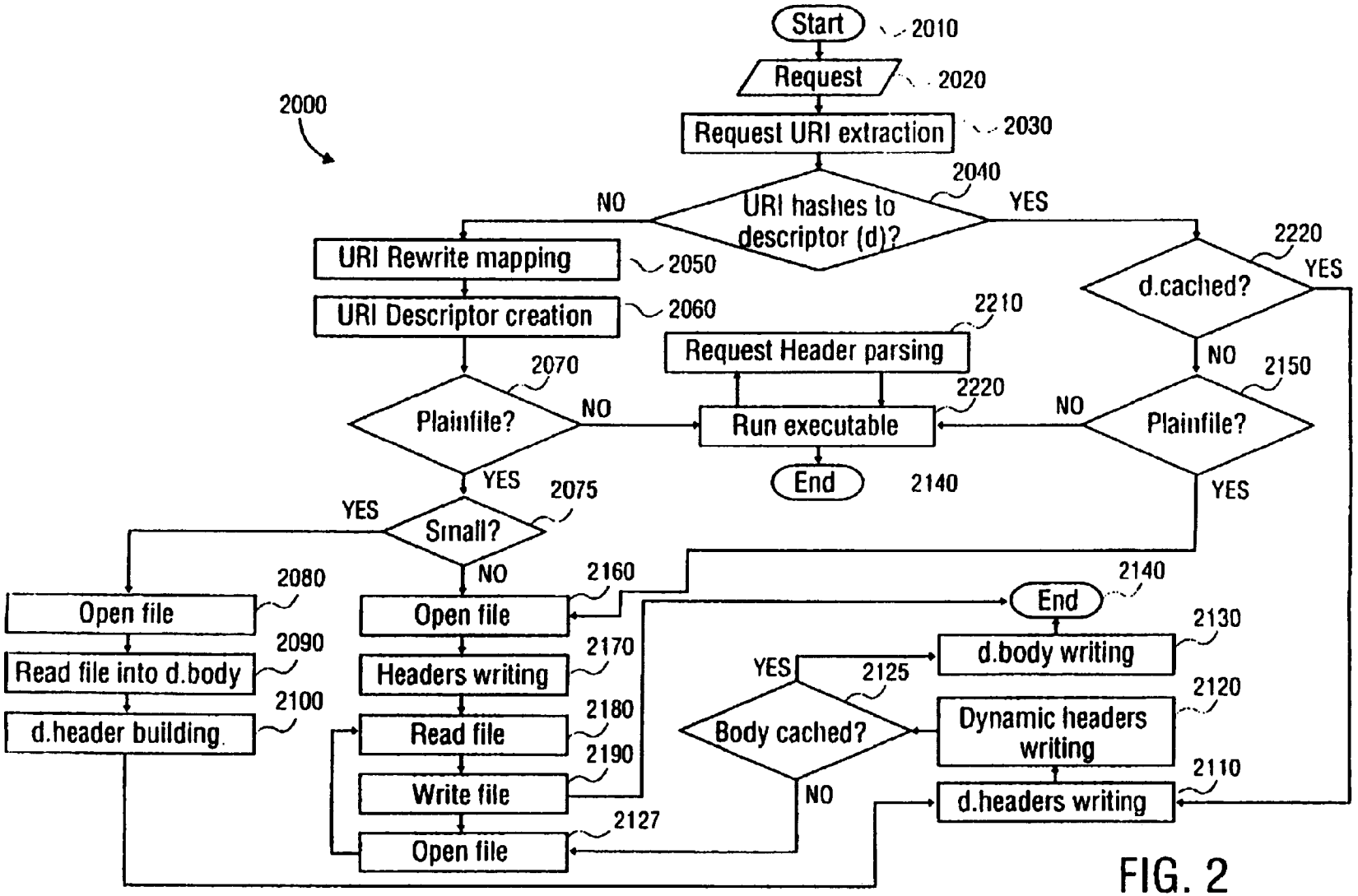
FIG. 2 is a flow diagram of a method for efficient server response generation using intermediate state caching in accordance with an illustrative embodiment.

FIG. 2 depicts a flow diagram, of an 'efficient response generation' method 2000 in accordance with an illustrative embodiment. To more concisely describe FIG. 2 reference will be made to one particular instance of a URI Descriptor data structure, mnemonically "d", similar to the $N^{th}$ URI Descriptor data structure 1400. In this illustrative embodiment, steps of this method are performed by a server process, for instance a suitably modified version of the Apache HTTP server (available [from <http://www.apache.org> and] in many commercial products). The particular server application is not fundamental, and others may be used without limitation, on variants of POSIX-like operating systems, WINDOWS operating systems from Microsoft Corp. of Redmond, Wash., or other operating systems.

Process flow initiates at a 'start' terminal 2010 and continues to receive a 'request' data block 2020. In this illustrative embodiment, the 'request' data block 2020 is a Request Message in accordance with the Hypertext Transfer Protocol ("HTTP"). However, as one of skill in the art will appreciate, other embodiments of the invention could work with other communication protocols and the particular protocol is not fundamental. In accordance with the draft HTTP/1.1 (available from *the* World Wide Web Consortium [at <http://www.w3c.org>] and the MIT Laboratory for Computer Science in Cambridge, Mass.), a Request Message comprises: a Request Line and zero or more Message Headers. A compliant Request Line comprises the URI and, in practice, typically several Message Headers are included in a Request Message that provide request modifying information, for instance as set forth in the HTTP protocol.

Next, a 'request URI extraction' process 2030 extracts the URI from the Request Line and process flow continues to a 'URI hashes to descriptor' decision process 2040. Using a conventional case-insensitive hash function, the 'URI hashes to descriptor' decision process 2040 hashes the URI received from the 'request' data block 2020 for a lookup operation in the hash table 1100. (One of skill will appreciate that use of a hash table is not fundamental; other data models could be used; preferably, the data model provides O(1) speed for lookup independent of the size of data set.) If the URI is not found in the hash table 1100, the 'URI hashes to descriptor' decision process 2040 exits through its 'no' branch and process flow continues to a 'URI rewrite mapping' process 2050.

The 'URI rewrite mapping' process 2050 performs a translation from the URI to an internal name for the resource associated with the URI. Typically the internal name is a location in the filesystem of the hardware running the server process. However, the URI may also map to, for instance, debugging information, a directory listing, or one of several default internal names of the server process. When Apache is used, the mod_rewrite uniform resource identifier rewriting engine may be used, and analogously functioning modules may be used with other servers, if desired. Typically, the flexible mapping from the URI to an internal name involves relatively computationally expensive parsing and extraction. Appreciable efficiencies may be obtained by caching the results of this mapping so that it need not be repeated for succeeding requests for the same resource. When the internal name for the resource has been determined, process flow then continues to a 'URI descriptor creation' process 2060.

The 'URI descriptor creation' process 2060 uses the URI and the internal name to create a URI Descriptor data structure that will, in part, cache the mapping performed by the 'URI rewrite mapping' process 2050. The 'URI descriptor creation' process 2060 creates a copy of the URI Descriptor data structure in the hash table 1100, sets the first variable 1455 indicating the resource is cached, sets the second variable 1460 indicating the type of file, and the third variable 1465 indicating the internal name for the resource.

Process flow continues to a 'plainfile' decision process 2070 and a 'small' decision process 2075 that determine whether the resource is a candidate for caching. In some variations of this illustrative embodiments two criteria must be met for the resource to be cached. First, the resource must be a plain file, and second the file must be 'small.' In variations, response headers can be cached even when the resource is not, for instance, if the resource is not 'small'.

In some illustrative embodiments, a resource is a plain file if it does not require running executable code to generate a response, although other criteria could also be used. If the 'plainfile' decision process 2070 determines the resource is a plainfile, it exits through its 'yes' branch and process flow continues to the 'small' decision process 2075. Whether a file is 'small' for the purposes of this illustrative embodiment is a function of the caching policy, the server architecture, and the memory architecture of the hardware running the server process. First, the caching policy determines the number of files to cache. Some preferred embodiments use a FIFO cache with a fixed size of 20 files, although many other caching policies are within the level of ordinary skill in the art and could be used as well. It will be appreciated, that the more complex the collection of resources frequently requested from the server, the more desirable it becomes to have a cache with a greater fixed size; analogously, the less complex, the smaller the fixed size may be set. Second, the server architecture determines the number caches that need to be stored. A typical server running in a POSIX-like environment, e.g., Apache v.1.3.6 running under SOLARIS v. 2.7, will have several concurrently-executing request handling processes each with an independent address space. If each request handling process stores its own cache in its own address space, then there are as many caches as there are request handling process. Another typical situation is where a server runs in a multithreaded environment. In this instance, several concurrently executing request handling processes can share a common address space. A single cache can be stored in the common address space and accessed by all request handling processes (suitably synchronized). Third, the amount of physical memory available for cache(s) on the machine executing the server process provides an upper bound. Considering these factors, a size for a 'small' file may be determined as follows:

$$f = \frac{M}{N \cdot C} \text{ where}$$

f = Size of a 'small' file

M = Memory available for cache(s)

N = The number independent caches

C = Number of files per cache

It will be apparent to one skilled in the art that other cache polices will give rise to differing ways to make similar determinations and for conventional cache policies, it is within the ordinary skill in the art to suitably ascertain which files are desirable to cache.

If the 'small' decision process 2075 determines the resource is 'small', it exits through its 'yes' branch and process flow continues to an 'open file' process 2080 that opens the file associated with the resource. Next a 'read file into d.body' process 2090 reads the file associated with the resource into the buffer referenced by the sixth variable 1480, e.g, it creates the cached response body 1500, and assigns a value to the fourth variable 1470 of the length of the file associated with the resource. Process flow continues to a 'd.headers building' process 2100 that constructs the response headers. In embodiments that use the HTTP protocol, the response is a Response Message in accordance with the HTTP protocol and the response headers generally provide information about the server and about further access to the resource identified by the request. The 'd.headers building' process 2100 also reads the constructed response headers into the buffer referenced by the seventh variable 1485, e.g, the cached response header 1600, and assigns a value to the fifth variable 1475 of the length of the response headers. This substantially completes generation of the response and storage of intermediate state information in the URI Descriptor data structure.

This done, the response can be transmitted to the client and a 'd.headers writing' process 2110 begins communicating the response by writing the response headers from the cached response header 1600 referenced by the seventh variable 1485. In some instances, not all headers for the response can be cached and must be created dynamically at the time of transmitting the response, for instance the current date and time. A 'dynamic headers writing' process 2120 continues communicating the response to the client by writing any response headers that need to be created at the time of generating the response.

Next, a 'body cached' decision process 2125 determines whether the body of the resource is cached. In some variations, response headers are cached while the body of the resource is not. This may occur, for instance, when the resource is not a small file. In other instances, it may be desirable only to cache response headers. The 'body cached' decision process 2125 determines whether the body is cached. If so, the 'body cached' decision process 2125 exits through its 'yes' branch and a 'd.body writing' process 2130 completes communicating the response by writing the response body from the cached response body 1500 referenced by the sixth variable 1480 in the URI Descriptor data structure. Process flow completes through an 'end' terminal 2140.

If the 'body cached' decision process 2125 determines the body is not cached, it exits through its 'no' branch and process flow continues an 'open file' process 2127 that opens the file associated with the resource for reading, a 'read file' process 2180 that reads the resource, and a 'write file' process 2190 that completes the response by writing the resource. Process flow then completes through the 'end' terminal 2140.

Returning to the 'small' decision process 2075, when the resource is not 'small', the 'small' decision process 2075 exits through its 'no' branch and the response is generated. Response generation begins with an 'open file' process 2160 that opens the file associated with the resource for reading. Next, a 'headers writing' process 2170 generates and writes the response headers and the 'read file' process 2180 reads the resource. Then, the 'write file' process 2190 completes the response by writing the resource. Process flow then completes through the 'end' terminal 2140.

In varations where response headers are cached even when the resource itself is not, for instance when the resource is not 'small', the 'headers writing' process 2170 may also perform the function of caching the response headers. This may occur as was described above with reference to the 'd.headers building' process 2100.

Returning to the 'plainfile' decision process 2070, if it determines the resource is not a plain file, the 'plainfile' decision process 2070 exits through its 'no' branch and process flow continues to a 'run executable' process 2200. The 'run executable' process 2200 executes the instructions, e.g. servlet, script, database query, etc., responsible for generating the response. The 'run executable' process 2200 interacts with a 'header parsing' process 2210 that parses those headers from the request received in the 'request' data block 2020 that are necessary for generating the response. It will be appreciated that the request headers are only parsed when the 'run executable' process 2200 is entered, and then only those headers are parsed that are required by the particular instructions responsible for generating the response. Eliminating unnecessary parsing of headers from the request appreciably reduces the average computational overhead necessary for response generation. When the 'run executable' process 2200 completes generation of the response, it outputs the response for transmission to the client and process flow completes through the 'end' terminal 2140.

Now returning to the 'URI hashes to descriptor' decision process 2040, if the URI from the 'request' data block 2020 is found when a lookup is performed in the hash table 1100, the 'URI hashes to descriptor' decision process 2040, exits through its 'yes' branch. This occurs when a second (or later) request for a given resource occurs (and the URI Descriptor data structure associated with the resource has not already been displaced from the cache). Process flow continues to an 'd.cached' decision process 2220. The 'd.cached' decision process 2220 consults the first variable 1455 in the URI Descriptor data structure to determine whether the resource associated with the request URI is cached. If the resource is cached, the 'd.cached' decision process 2220 exits through its 'yes' branch to the 'd.headers writing' process 2110 and the 'dynamic headers writing' process 2120 that write the cached headers, as well as any dynamically-created headers for the response. Next, the 'body cached' decision process 2125 determines whether the body of the response is cached and process flow continues to the 'open file' process 2127 or the 'd.body writing' process 2130, to generate the body of the response, as previously described. Process flow then completes through the 'end' terminal 2140.

If the 'd.cached' decision process 2220, determines that the resource associated with the request URI is not cached, it exits through its 'no' branch and process flow continues to a 'plain file' decision process 2150. If the 'plain file' decision process 2150 determines the resource is not a plain file, it exits through its 'no' branch and process flow continues to the 'run executable' process 2200 and continues as was previously described. If the 'plain file' decision process 2150 determines the response is a plain file, it exits through its 'yes' branch and process flow continues to the 'open file' process 2160 and the response is generated as was previously described.

Figure 3:
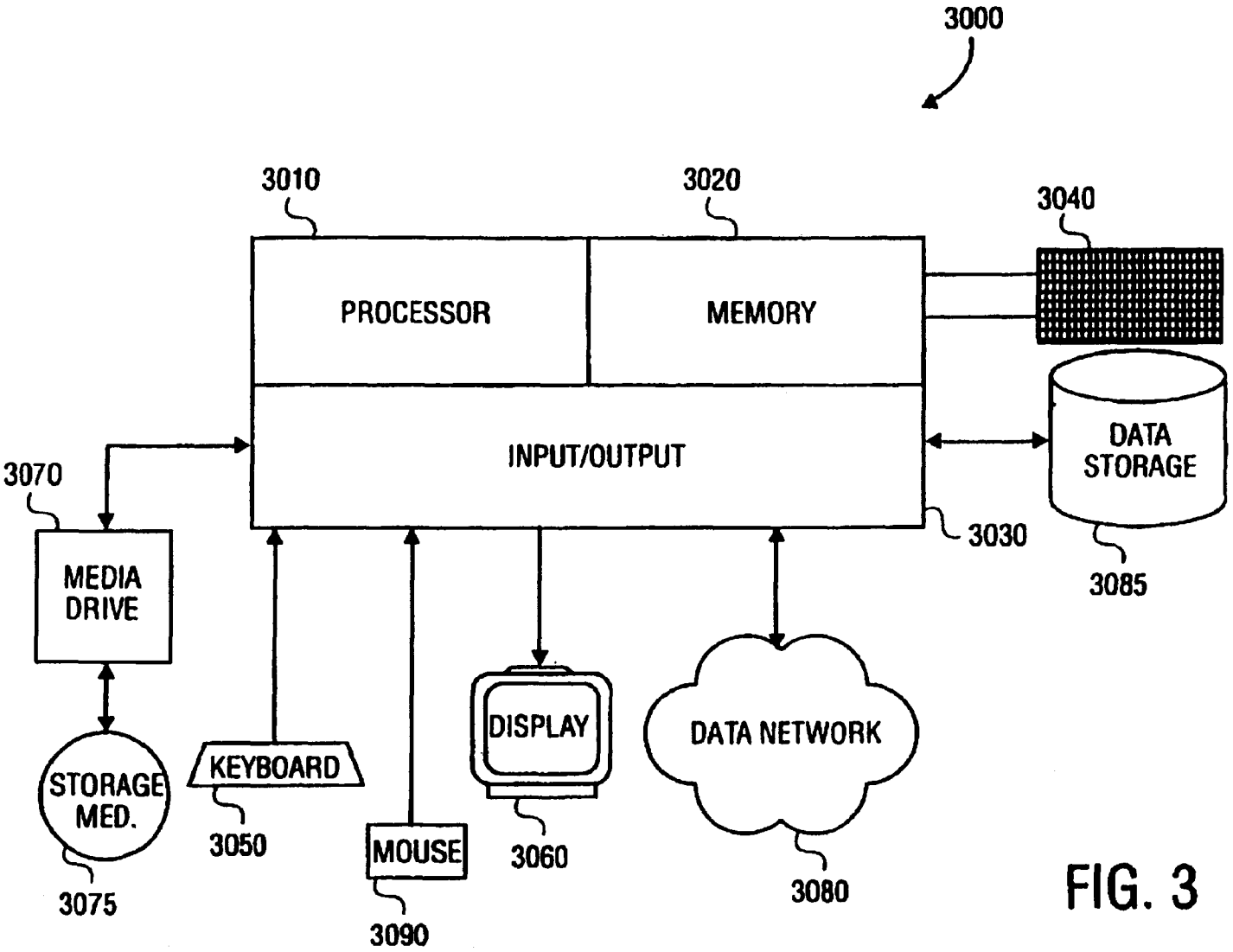
FIG. 3 depicts a computer system capable of being configured to embody aspects of the invention in accordance with an illustrative embodiment.

FIG. 3 depicts a computer system 3000 capable of embodying aspects of the invention. The computer system 3000 comprises a microprocessor 3010, a memory 3020 and an input/output system 3030. The memory 3020 is capable of being configured to provide a data structure 3040, such as the cache data architecture 1000, which may contain data manipulated by the computer system 3000 when embodying aspects of the invention. Further illustrated is a media drive 3070, such as a disk drive, CD-ROM drive, or the like. The media drive 3070 may operate with a computer-usable storage medium 3075 capable of storing computer-readable program code able to configure the computer system 3000 to embody aspects of the invention. The input/output system 3030 may also operate with a keyboard 3050, a display 3060, a data network 3080 such as the internet or the like (through an appropriate network interface), a mass data storage 3085, and a pointing device 3090. As illustrated, the computer system 3000 is general-purpose computing machinery. As one of skill recognizes, programmed instructions may configure general purpose computing machinery to embody structures capable of performing functions in accordance with aspects of the invention. Special purpose computing machinery comprising, for example, an application specific integrated circuit (ASIC) may also be used. One skilled in the art will recognize, numerous structures of programmed or programmable logic capable of being configured to embody aspects of the invention. In some illustrative embodiments, the computer system 3000 is an UltraSPARC workstation from Sun Microsystems of Mountain View, Calif., that runs the SOLARIS operating system (also from Sun) and the Apache HTTP (web) server application.

All documents, standards, protocols, and draft protocols referred to herein are incorporated herein by this reference in their entirety.

The present invention has been described in terms of features illustrative embodiments. To fully described the features of the present invention, embodiments were selected that fully illustrated the features of the invention. However, one skilled in the art will understand that various modifications, alterations, and elimination of elements may be made without departing from the scope of the invention. Accordingly, the scope of the invention is not to be limited to the particular embodiments discussed herein, but should be defined only by the allowed claims and equivalents thereof.

What is claimed is:

1. A computer-implemented method for efficiently generating responses for repeated resource requests comprising:

receiving a first request for a first resource, said first request comprising a resource identifier and request modifying information;

determining whether generating a response for said first request requires parsing said request modifying information; and, if not, generating said response without parsing said request modifying information.

2. The computer-implemented method of claim 1 wherein the request modifying information includes request headers.

3. The computer-implemented method of claim 1 wherein generating the response for the first request requires parsing said request modifying information if the request is generated by executing instructions.

4. The computer-implemented method of claim 3 wherein parsing the request modifying information includes parsing only a subset of the request modifying information necessary for generating the request.

5. The computer-implemented method of claim 3 wherein the executing the instructions comprises executing a servlet.

6. The computer-implemented method of claim 3 wherein the executing the instructions comprises executing a script.

7. The computer-implemented method of claim 3 wherein the executing the instructions comprises executing a database query.

8. Apparatus comprising a processor, a memory, a network interface, and a file system, programmed instructions configuring said apparatus to accept connections in order to service requests by sending responses thereto, said apparatus further configured with programmed instructions comprising:

a request receiver configured for receiving a first request for a first resource, said first request comprising a resource identifier and request modifying information;

a response generator configured for generating a response to said first request and further configured for determining whether generating said response requires parsing said request modifying information; and a request modifying information parser configured to parse request modifying information only when said response generator determines generating said response requires parsing said request modifying information.

9. The apparatus of claim 8 wherein the response generator configured to determine that generating the response requires parsing if the response generator to generate the response by executing instructions.

10. The apparatus of claim 8 wherein the request modifying information parser configured to parse only a subset of the request modifying information necessary for generating the response.

11. The apparatus of claim 8 wherein the request modifying information includes request headers.

12. The apparatus of claim 9 wherein the instructions is a servlet.

13. The apparatus of claim 9 wherein the instructions is a database query.

14. The apparatus of claim 9 wherein the instructions is a script.

15. A computer program product comprising a *non-transitory* computer-readable medium having computer readable instructions encoded thereon for reducing parsing of request modifying information, comprising[;]:

computer program instructions configured to cause a computer to receive a first request for a first resource, said first request comprising a resource identifier and request modifying information;

computer program instructions configured to cause a computer to determine whether generating a response for said first request requires parsing said request modifying information; and computer program instructions configured to cause a computer to generate said response without parsing said request modifying information if generating said response does not require parsing said request modifying information.

*16. A computer-implemented method for efficiently generating responses for repeated resource requests comprising:*

*receiving a first request for a first resource, said first request including a resource identifier and one or more parameters;*

*determining whether generating a response for said first request requires parsing said one or more parameters; and, if not,*

*generating said response without parsing said one or more parameters.*

*17. The method of claim 16, wherein said first request is an HTTP request.*

*18. The method of claim 16, wherein said first request corresponds to a request for an enhanced television resource.*

*19. The method of claim 16, wherein said resource identifier is an URI.*

*20. The method of claim 16, wherein said one or more parameters include one or more request headers.*

*21. The method of claim 16, wherein said determining is based at least in part on whether generating a response for said first request requires running executable code.*

*22. The method of claim 16, wherein determining is based at least in part upon cached information indicative of a file type of said first resource.*

*23. The method of claim 16, further comprising parsing said one or more parameters if said parsing is required to generate said response for said first request.*

*24. The method of claim 16, further comprising executing code as a part of generating said response for said first request.*

*25. The method of claim 24, wherein said code is a servlet.*

*26. The method of claim 24, wherein said code is a script.*

*27. The method of claim 24, wherein said code is a database query.*

*28. The method of claim 24, wherein said method further comprises parsing one or more request headers in said first request if responding to said first request requires running executable code.*

*29. The method of claim 28, wherein only those request headers in said first request necessary to generate said response for said first request are parsed.*

*30. The method of claim 16, wherein said generating includes using cached information.*

*31. The method of claim 16, wherein said generating includes using said resource identifier to determine that information responsive to said first request is cached.*

*32. The method of claim 31, wherein said determining whether information responsive to said first request is cached includes using said resource identifier to access a hash table.*

*33. The method of claim 31, wherein said generating includes accessing a cached mapping of said resource identifier to a second identifier.*

*34. The method of claim 33, wherein said second identifier is indicative of a location of said first resource.*

*35. The method of claim 31, wherein said generating includes accessing cached debugging information associated with said first resource.*

*36. The method of claim 31, wherein said generating includes accessing cached directory listing information corresponding to said first resource.*

*37. The method of claim 31, wherein said generating includes accessing a cached body of said first resource.*

*38. The method of claim 37, wherein said generating includes dynamically generating headers corresponding to said first resource.*

*39. The method of claim 31, wherein said generating includes accessing cached headers corresponding to said first resource.*

*40. The method of claim 39, wherein said generating includes accessing a non-cached body of said first resource.*

*41. The method of claim 16, wherein said generating includes determining that information responsive to said first request for said first resource is not cached.*

*42. The method of claim 41, wherein said determining that information responsive to said first request is not cached includes using said resource identifier to access a hash table.*

*43. The method of claim 41, wherein said generating includes mapping said resource identifier to a second identifier.*

*44. The method of claim 43, wherein said second identifier is indicative of a location of said first resource.*

*45. The method of claim 44, further comprising caching said second identifier.*

*46. The method of claim 41, wherein said generating includes accessing debugging information associated with said first resource.*

*47. The method of claim 46, further comprising caching said debugging information.*

*48. The method of claim 41, wherein said generating includes accessing directory listing information corresponding to said first resource.*

*49. The method of claim 48, further comprising caching said directory listing information.*

*50. The method of claim 41, wherein said generating includes accessing a body of said first resource.*

*51. The method of claim 50, wherein said generating includes generating one or more response headers.*

*52. The method of claim 50, further comprising caching said body of said first resource.*

*53. The method of claim 51, further comprising caching one or more of said response headers.*

*54. The method of claim 41, further comprising caching information used in generating said response for said first request.*

*55. The method of claim 41, further comprising determining whether to cache information used in generating said response for said first request.*

*56. The method of claim 55, wherein said caching is performed according to a caching policy that is based at least in part on a file type of said first resource.*

*57. The method of claim 55, wherein said caching is performed according to a caching policy that is based at least in part of the size of said first resource.*

*58. An apparatus configured to generate responses for repeated resource requests, said apparatus comprising:*

*a network interface configured to receive a first request for a first resource, said first request including a resource identifier and one or more parameters;*

*wherein said apparatus is configured to determine whether generating a response to said first request requires parsing said one or more parameters, and, if not, said apparatus is configured to generate said response to said first request without parsing said one or more parameters.*

*59. The apparatus of claim 58, wherein said first request is an HTTP request.*

*60. The apparatus of claim 58, wherein said first request corresponds to a request for an enhanced television resource.*

*61. The apparatus of claim 58, wherein said resource identifier is an URI.*

*62. The apparatus of claim 58, wherein said one or more parameters include one or more request headers.*

*63. The apparatus of claim 58, further comprising a cache, and wherein said apparatus is configured to determine whether information responsive to said first request is located in said cache.*

*64. The apparatus of claim 63, wherein said cache is configured to store a mapping of said resource identifier to a second identifier.*

*65. The apparatus of claim 64, wherein said second identifier is indicative of a location of said first resource.*

*66. The apparatus of claim 64, wherein said apparatus is a server, and wherein said second identifier is indicative of an internal name of said first resource on said server.*

*67. A server configured to concurrently execute a plurality of request handling processes, wherein each of said plurality of request handling processes is configured to receive requests for resources located on said server, each of said received requests including a resource identifier and one or more associated parameters;*

*wherein each of said plurality of request handling processes is configured to determine whether generating responses for each of said received requests requires parsing said one or more associated parameters, and, if not, each of said plurality of request handling processes is configured to generate responses to said received requests without parsing said one or more associated parameters.*

*68. The server of claim 67, wherein each of said plurality of request handling processes has an independent address space including a cache.*

*69. The server of claim 67, wherein said received requests include an HTTP request.*

*70. The server of claim 67, wherein said received requests include a request for an enhanced television resource.*

*71. The server of claim 67, wherein said received requests include a resource identifier that is an URI.*

*72. The server of claim 67, wherein said received requests include one or more parameters that are request headers.*

*73. The server of claim 67, wherein each cache corresponding to said plurality of request handling processes is configured to store information responsive to received resource requests.*

*74. The server of claim 73, wherein said stored information includes mappings of first identifiers to secondary identifiers, wherein said first identifiers are included in said resource requests received by said server.*

*75. The server of claim 74, wherein said secondary identifiers are indicative of locations of resources on said server.*

*76. The server of claim 67, wherein said plurality of request handling processes share a common independent address space including a cache.*

*77. The server of claim 76, wherein said received requests include an HTTP request.*

*78. The server of claim 76, wherein said received requests include a request for an enhanced television resource.*

*79. The server of claim 76, wherein said received requests include a resource identifier that is an URI.*

*80. The server of claim 76, wherein said received requests include one or more parameters that are request headers.*

*81. The server of claim 76, wherein the cache is configured to store information responsive to received resource requests.*

*82. The server of claim 81, wherein said stored information includes mappings of first identifiers to secondary identifiers, wherein said first identifiers are included in said resource requests received by said server.*

*83. The server of claim 82, wherein said secondary identifiers are indicative of locations of resources on said server.*

*84. A computer program product comprising a non-transitory computer-readable medium having computer readable instructions encoded thereon, comprising:*

*computer program instructions configured to cause a computer to receive a first request for a first resource, said first request comprising a resource identifier and one or more parameters;*

*computer program instructions configured to cause a computer to determine whether generating a response for said first request requires parsing said one or more parameters; and*

*computer program instructions configured to cause a computer to generate said response without parsing said one or more parameters if generating said response does not require parsing said one or more parameters.*

*85. The computer program product of claim 84, wherein said first request is an HTTP request.*

*86. The computer program product of claim 84, wherein said first request is a request for an enhanced television resource.*

*87. The computer program product of claim 84, wherein said resource identifier is an URI.*

*88. The computer program product of claim 84, wherein said one or more parameters include request headers.*

* * * * *

UNITED STATES PATENT AND TRADEMARK OFFICE

CERTIFICATE OF CORRECTION

PATENT NO. : RE42,169 E
APPLICATION NO. : 11/318395
DATED : February 22, 2011
INVENTOR(S) : Weber It is certified that error appears in the above-identified patent and that said Letters Patent is hereby corrected as shown below:

Column 9, line 23, in Claim 8, delete "Apparatus" and insert -- An apparatus --.

Signed and Sealed this
Fifth Day of July, 2011

David J. Kappos

David J. Kappos
*Director of the United States Patent and Trademark Office*